United States Patent [19]
Horden et al.

[11] Patent Number: 5,812,860
[45] Date of Patent: Sep. 22, 1998

[54] METHOD AND APPARATUS PROVIDING MULTIPLE VOLTAGES AND FREQUENCIES SELECTABLE BASED ON REAL TIME CRITERIA TO CONTROL POWER CONSUMPTION

[75] Inventors: A. Ira Horden; Steven D. Gorman, both of Phoenix; Lionel S. Smith, Queen Creek, all of Ariz.

[73] Assignee: Intel Corporation, Santa Clara, Calif.

[21] Appl. No.: 599,648

[22] Filed: Feb. 12, 1996

[51] Int. Cl.$^6$ ........................................................ G06F 1/26
[52] U.S. Cl. ................................ 395/750.04; 395/750.07; 327/113; 331/143
[58] Field of Search ........................................ 395/750, 556, 395/750.04, 750.07; 327/113, 544; 364/707; 326/80, 81; 331/143

[56] References Cited

U.S. PATENT DOCUMENTS 5,153,535  10/1992  Fairbanks et al. .
5,627,412  5/1997  Beard .

*Primary Examiner*—Ayaz R. Sheikh
*Assistant Examiner*—Rupal D. Dharia
*Attorney, Agent, or Firm*—Blakely, Sokoloff, Taylor & Zafman

[57] ABSTRACT

A method and system for reducing power consumption in a processor core. A state machine is used to coordinate a frequency from a clock signal generator with a voltage from a voltage regulator which is sufficient to allow operation of the processor at that frequency. Both the clock signal generator and the voltage regulator must be able to generate at least two frequencies or voltages, respectively. A level of processor need is tracked and the lowest frequency/voltage pair that will allow the processor core to satisfy the need is selected. The level of processor need is monitored either periodically or continually such that a new frequency/voltage pair can be dynamically selected as the application mix changes.

6 Claims, 4 Drawing Sheets

MegaHertz

| Vcc[V] | 8 | 12 | 16 | 20 | 24 | 28 | 32 |
|---|---|---|---|---|---|---|---|
| 3 | 120 | 180 | 240 | 300 | 360 | 420 | 480 |
| 2.75 | 101 | 151 | 202 | 252 | 303 | 353 | |
| 2.5 | 83 | 125 | 167 | 208 | 250 | | |
| 2.25 | 68 | 101 | 135 | 169 | | | |
| 2 | 53 | 80 | 107 | | | | |
| 1.75 | 41 | 61 | | | | | |

Fig. 2c

METHOD AND APPARATUS PROVIDING MULTIPLE VOLTAGES AND FREQUENCIES SELECTABLE BASED ON REAL TIME CRITERIA TO CONTROL POWER CONSUMPTION

BACKGROUND OF THE INVENTION

(1) Field of the Invention

The invention relates to reducing power consumption by VLSI circuitry. More specifically, the invention relates to manipulating a voltage and a frequency supplied to VLSI circuitry to achieve lower average power consumption by the VLSI logic circuitry.

(2) Related Art

As more systems become portable, increased reliance will necessarily be placed on portable power supplies, particularly batteries. Reducing power consumption by processors becomes increasingly important as the industry moves to maximize battery life. Even in stationary systems, excessive power consumption translates into higher operational costs. Additionally, increasingly stringent governmental requirements and environmental standards militate toward reducing the power consumed in a computer system where possible.

The power consumed by CMOS VLSI circuitry is proportional to $f \times V^2$ where f is the frequency and V is the voltage. It is relatively common for power sensitive products to adjust the frequency to achieve a linear reduction in power consumption by the circuitry. Early processor packaging provided only a single set of voltage input pins (Vcc). Because external logic typically requires three or five volts, it has not been possible to separably adjust the voltage to achieve any power savings. VLSI fabrication techniques allow the introduction of two sets of power pins and accordingly two different voltage levels on a single chip. For example, a processor core is typically constructed on the die and surrounded by peripherals, all of which operate on the voltage of the processor core. Around these components is a lead frame which provides for connection to external devices. Each interface at the lead frame is known as a pad, and all the pads taken together are a pad ring. The pad ring is typically supplied by a separate power supply. Different power supplies allow for improved noise characteristics and the use of different voltages as pad and core voltages. While this allows a separate core voltage and, therefore, some effect on the VLSI circuits power consumption, the VLSI circuits power consumption is still limited by the worst case application mix if the peak level of performance is to be maintained. For example, if a processor must operate at 32 MHz, the voltage maintained must allow operation at 32 MHz, e.g., must be $\geq 2.75$ V.

Each frequency has a minimum voltage at which the CPU can operate and maintain operation. The required voltage normally increases with increased frequency. Frequency is a key measure of performance. Processors having greater peak performance require higher frequencies which depend in turn upon higher voltages with a significantly higher power consumption. While in most cases sufficient processing can be performed at lower frequencies, the performance rating of the processor relies on its ability to handle a worst case load. Thus, the voltage at which the CPU can operate at the frequency required for a worst case application mix is typically employed to insure performance does not degrade below the specified peak. This results in excessive power usage any time the processing capacity is not fully utilized.

It would be desirable to be able to maintain a high peak performance rating while reducing power consumption through use of lower voltages when peak processing is unnecessary. It would, therefore, be desirable to be able to adjust the voltage and frequency based on a current application mix.

BRIEF SUMMARY OF THE INVENTION

A method and system for reducing power consumption in VLSI circuit is disclosed. A state machine is used to coordinate a frequency from a clock signal generator with a voltage from a voltage regulator which is sufficient to allow a desired level of operation of the VLSI circuit at that frequency. Both the clock signal generator and the voltage regulator must be able to generate at least two frequencies or voltages, respectively. A level of VLSI circuit performance need is tracked, and the optimal frequency/voltage pair that will allow the VLSI logic to run with a minimum power consumption. The level of VLSI circuit performance need is monitored either periodically or continually such that a new frequency/voltage pair can be dynamically selected as the desired level of operation changes. This allows the VLSI circuit to satisfy even a worst case application mix at an established peak rating maintaining a high performance rating while dramatically reducing power consumption over prior art systems.

In an alternate embodiment, a maximum power consumption level is established below the maximum performance level of the system. The system then selects the frequency/voltage pair which most closely meets the application mix need, but is still below the maximum power consumption allowed. This embodiment may be useful where a user is willing to forego some performance to ensure at least a certain level of battery life.

BRIEF DESCRIPTION OF THE DRAWINGS

FIG. 2c is a table of data from which FIGS. 2a and 2b are derived.

DETAILED DESCRIPTION OF THE INVENTION

A method and apparatus for reducing power consumption in VLSI circuitry are disclosed. In the following description, for purposes of explanation, specific applications, numbers, materials, and configurations are set forth in order to provide a full understanding of the present invention. However, it would be apparent to one skilled in the art that the present invention may be practiced without the specific details. In other instances, well-known systems are shown in diagrammatical or block diagram form in order not to obscure the present invention unnecessarily. The following description is written using a processor core. For the sake of illustration, it should be understood that the invention is also applicable to other VLSI logic devices including without limitation VGA chip sets, MPEG decoder devices, etc.

Figure 1:
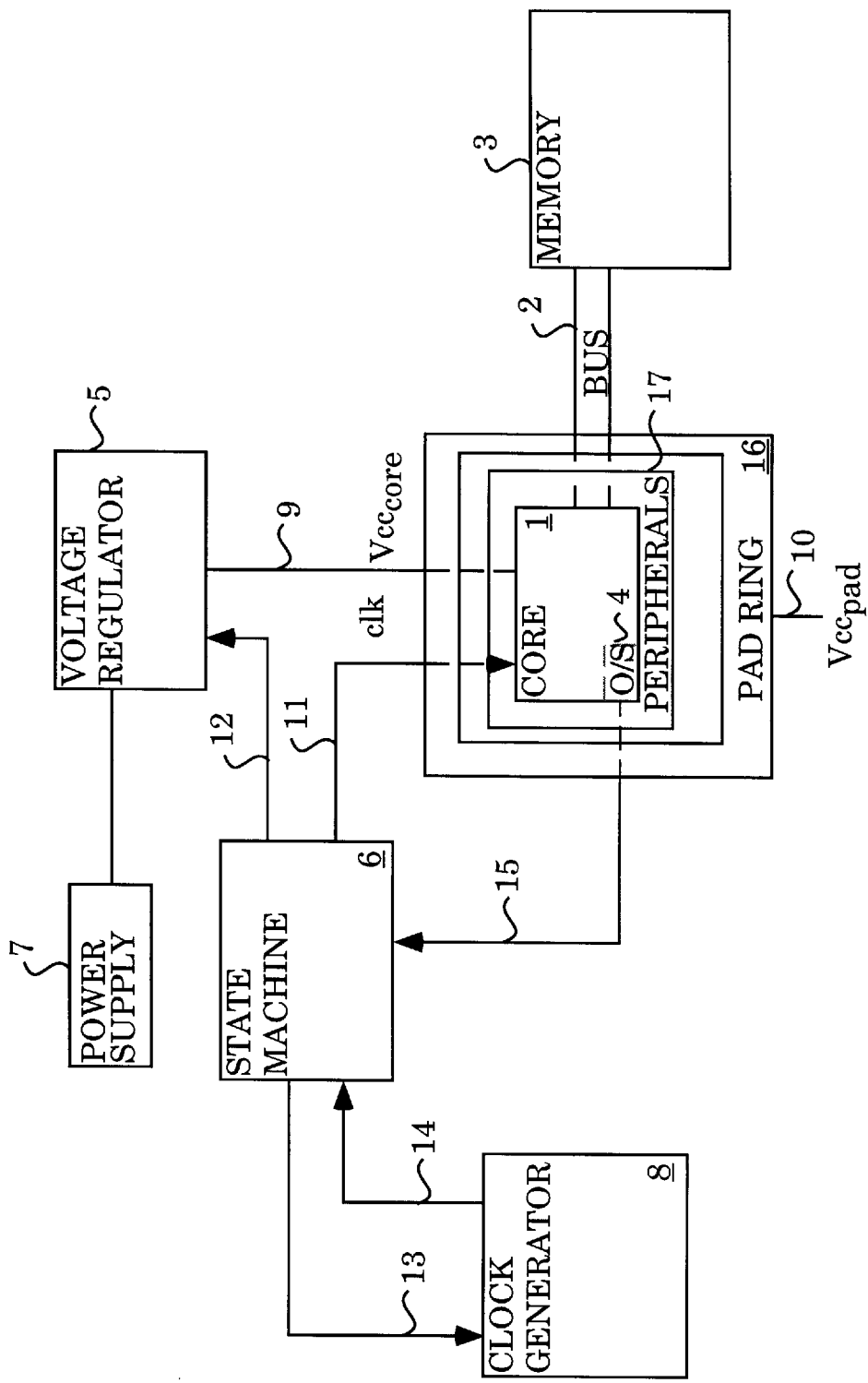
FIG. 1 is a block diagram of one embodiment of the invention.

FIG. 1 shows a block diagram of a system employing the invention. A processor core 1 running an operating system 4 and peripherals 17 coupled to a pad ring 16 is connected to a memory 3 by a bus 2. A power supply 7 which can be a battery or any other conventional power supply provides power to voltage regulator 5 which in turn provides a core voltage $Vcc_{core}$ 9. The peripherals 17 typically operate on $Vcc_{core}$ 9 and may include interrupt controllers and any other peripheral circuit packaged with the processor core. A second voltage $Vcc_{pad}$ 10 is provided to the pad ring 16 within which the core 1 resides. The voltage regulator 5, clock generator 8, and state machine 6 are shown discretely. It is envisioned that any or all of these components may be incorporated on a single chip and such is within the scope and contemplation of the invention.

Operating system 4 provides a control signal 15 to state machine 6. State machine 6 provides control signals 12 and 13 to voltage regulator 5 and dock generator 8, respectively. In the current invention, it is anticipated that voltage regulator 5 will support at least two voltages, and clock generator 8 will support at least two frequencies. The voltage regulator 5 is envisioned to include both the case where a single voltage regulator provides all supported voltages and the case where multiple voltage regulators provide different voltages. In the second case, changing the voltage supplied entails switching between independent voltage regulators. Both arrangements are commercially available. Similarly, clock generator 8 can produce its multiple frequencies using different crystals, clock division, or any other conventional way. Clock generator 8 responds to control signal 13 for providing a clock signal 14 to the state machine 6. The state machine 6 synchronizes the incoming dock signal 14 to the voltage change and provides synchronized dock signal 11 to the core processor 1. Voltage regulator 5 provides one of its supported voltages as the $Vcc_{core}$ 9 responsive to the control signal 12 from state machine 6. State machine 6 must insure that the specification of the processor core is continually adhered to. To this end, state machine 6 must control the slew rate of the voltage at the transition point, maintaining the appropriate slew for the particular device.

In one exemplary embodiment, voltage regulator 5 supports two voltages, and clock generator 8 supports two frequencies. One frequency corresponds to peak performance, for example, 32 MHz, and a second frequency corresponding to an idle core frequency, for example, 16 MHz. Voltage regulator 5 is configured to provide the minimum voltages required to operate the processor at 16 and 32 MHz which the clock generator 8 could supply. State machine 6 through control signals 12 and 13 insures that the voltage regulator 5 supplies the idle voltage when dock generator 8 is supplying an idle frequency, and the voltage generator 5 supplies a peak voltage when the clock generator 8 is supplying a peak frequency.

Operating system 4 notifies state machine 15 whether the core should be operating at peak or idle frequencies and voltages. In this embodiment, the operating system 4 need only identify whether core utilization and the corresponding required throughput can be handled at the supported idle frequency or if a higher frequency is required. If the state machine is in idle state and a higher frequency is required, the O/S asserts a switch state signal along control line 15. The state machine 6 then uses control lines 13 and 14 to drive the voltage regulator 5 and the clock generator 8 into the peak state. Conversely, if the total core usage could be accommodated at the idle state and the state machine is in the idle state, the O/S need not signal the state machine at all. An analogous case exists for transitioning the state machine from idle to peak. In an alternate embodiment, this same functionality may be performed using a hardware switch (not shown) (or even a second state machine) to provide the input to the state machine.

It will be recognized by one of ordinary skill in the art that even this two voltage embodiment will achieve significant power savings. In the above example, if the idle voltage is 2 V and the peak voltage is 2.75 V, and if we assume an even distribution between idle and peak performance, power consumption is reduced by 36% over a platform having a single peak voltage and a single frequency. Moreover, a power saving of 16% is achieved over a system having a single peak voltage of 2.75, but a variable frequency. As a practical matter, real systems tend to spend greater than 50% of their time in an idle mode, so reduction in power consumption can be expected to be even greater than the above example.

In an alternate embodiment, a voltage regulator 5 supports any number of voltages up to a continuum between two end points. It is envisioned that supporting a plurality of voltage pairs corresponding to different peak and idle levels will be a common form of this embodiment. Similarly, the dock generator 8 supports a plurality of frequencies and will be recognized by one of ordinary skill in the art that by supporting a multitude of voltages and frequencies, the granularity of the power reduction system can be improved such that the power expended more closely approximates the minimum power actually required to do the processing performed. In this embodiment, the operating system 4 acquires some objective measure of processor need for each application (not shown) seeking access to the processor core 1 which may or may be in MIPS, MFLOPS or another objective measure of processor need. One way this measure may be provided is by having each application tell the O/S its need or expected need based on operations to be performed. Modification to application programs which would be needed to provide this functionality would be readily apparent to persons skilled in the relevant art. The operating system 4 accumulates the processor need for all currently active applications. The operating system 4 then directs the state machine to transition into a state which as closely as possible matches the frequency and voltage to the application mix currently accessed in the processor core 1. It is envisioned that other considerations may in some cases drive the voltage/frequency pair selection. Among the other considerations are temperature, device behavior, and performance data.

In yet another embodiment, a maximum power consumption level is established by user, the operating system 4 or some sort of external consideration. This maximum power consumption basically creates a cap on the peak performance attainable. The operating system 4 creates a new peak at the closest supported frequency voltage point to the maximum power of consumption level. When this artificial peak is established, the system operates as it did in the embodiment discussed immediately above. Specifically, if the current application mix does not require the new peak performance level, the operating system drives the state machine into the lowest state which will meet the current mix requirements.

Figure 2A:
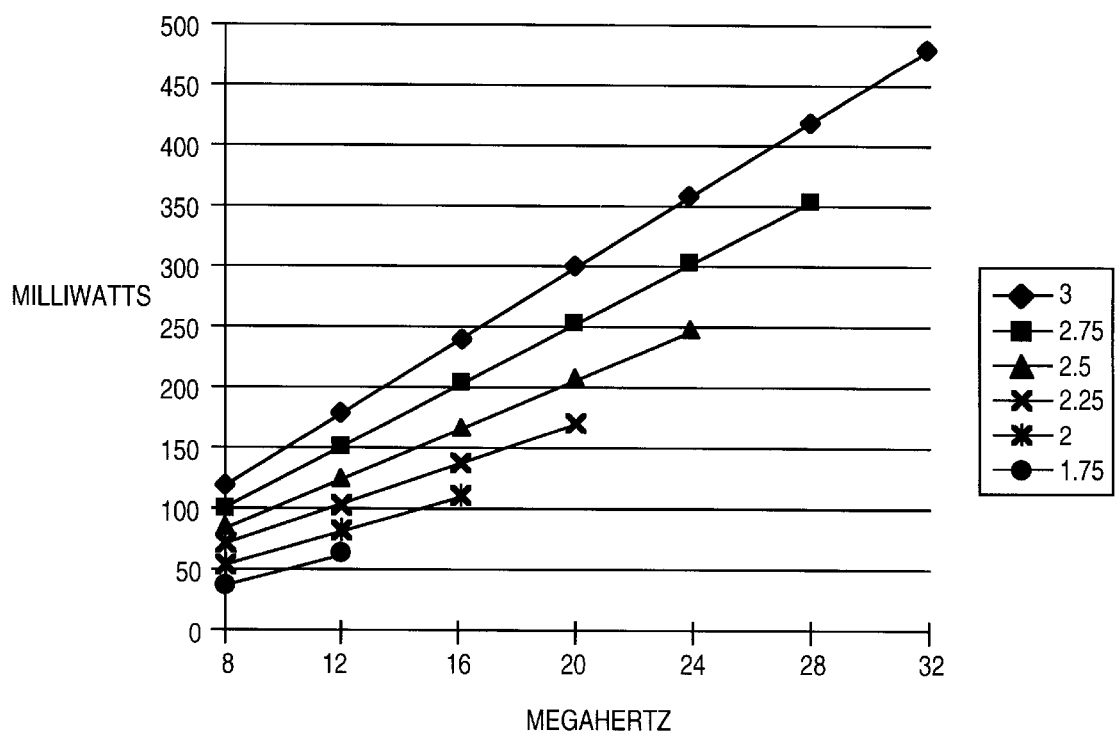
FIG. 2a is a graph of power consumption at various frequency and voltage levels.
Figure 2B:
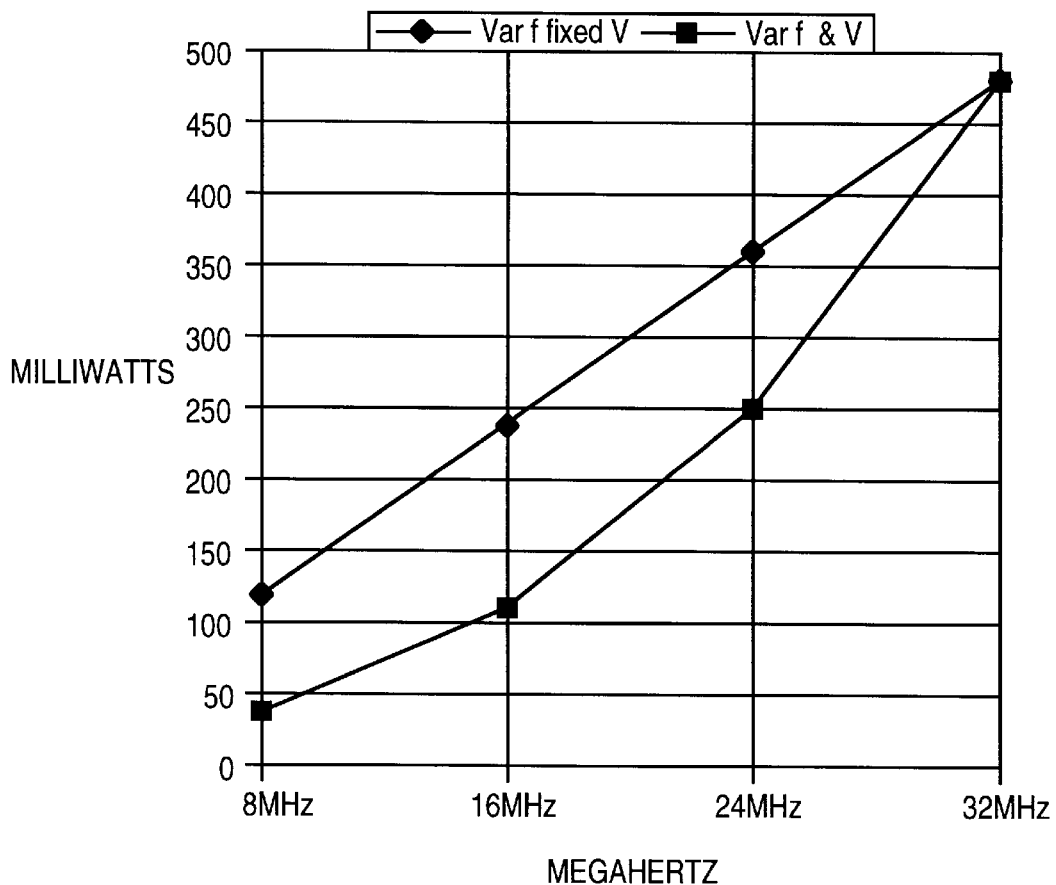
FIG. 2b is a graph showing possible power saving over a fixed voltage system.

FIG. 2a reveals the power consumption curves and various voltages and frequencies for a sample system. FIG. 2a shows the maximum frequency which the sample system could operate at 1.75 V is 12 MHz. At 2 V, the system can operate up to 16 MHz, at 2.25 V up to 20 MHz, at 2.5 V up to 25 MHz, at 2.75 or 3 V. The system can operate at least to 32 MHz. As the graph depicts, for any supported point, a lower voltage would yield a lower power of consumption at the same frequency. FIG. 2b shows a graph of one embodiment of the invention, power usage at various frequencies. Prior art, the power consumption curve in 3 V, the voltage is fixed at and the frequency is variable is also graphed in FIG. 2b. This graph illustrates the power savings that can be achieved at any point in time by providing the ability to modify the voltage to the minimum required to operate at the desired frequency. The aggregate power saving over time will depend on the granularity, e.g. number of voltage levels supported and the amount of time spent operating at each frequency. FIG. 2c shows the data from which FIGS. 2a and 2b are derived. While the graphs and data provide values up to 32 MHz, it is anticipated that the invention is not so limited and could be extended to any processor frequency. Such is considered within the scope and contemplation of the invention.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:
    a processor coupled to a memory by a bus, the processor having a processor core and a pad ring, the processor core having an independent power supply;
    a voltage regulator providing a plurality of voltages and providing the independent power supply;
    a clock signal generator providing a clock signal at a plurality of frequencies;
    a state machine to coordinate voltage and clock frequency to the processor core; and
    an operating system running on the processor, the operating system monitoring an application mix executing in the processor to determine a required frequency, and determining a minimum voltage at which the processor core can operate at the required frequency, wherein the operating system directs the state machine to enter a state in which the required frequency is supplied by the clock signal generator and a closest supported voltage equal to or greater than the minimum voltage is supplied by the voltage regulator.

2. The system of claim 1 wherein the voltage regulator provides one of an idle voltage or a peak voltage.

3. The system of claim 1 wherein the voltage regulator can provide one voltage corresponding to each frequency supported by the clock signal generator.

4. A method of reducing power consumption by a processor core and a pad ring comprising the steps of:
    accepting a measure of processor core performance need of each application currently seeking access to the processor core;
    accumulating each measure of processor core performance need to find total current need;
    calculating a minimum frequency that will allow the processor core to meet the total current need for the time period;
    selecting a lowest supported frequency equal to or greater than the minimum frequency to be a required frequency;
    finding a minimum supported voltage at which the processor core can operate at the required frequency independent of a voltage required by the pad ring;
    supplying the required frequency and the minimum supported voltage to the processor core; and
    dynamically changing the required frequency and the minimum supported voltage supplied responsive to a change in the current application mix.

5. A method of reducing power consumption by a processor core and a pad ring comprising the steps of:
    establishing a maximum allowable power consumption;
    finding a maximum supported frequency which will allow the processor core to remain below the maximum allowable power consumption at the minimum supported voltage;
    selecting a required frequency to be less than or equal to the maximum supported frequency;
    finding a minimum supported voltage at which the processor core can operate at the required frequency independent of a voltage required by the pad ring;
    supplying the required frequency and the minimum supported voltage to the processor core; and
    dynamically changing the required frequency and the minimum supported voltage supplied responsive to a change in the current application mix.

6. The method of claim 5 wherein a required frequency less than the maximum supported frequency is selected whenever a total processor core performance need of the current application mix can be met by a lower supported frequency.

* * * * *